(Specimens.)

W. LEIGHTON, Jr.
MANUFACTURE OF SPANGLED GLASSWARE.

No. 292,663. Patented Jan. 29, 1884.

Witnesses:
J. Snowden Bell.
Samuel Wolcott

Inventor: William Leighton Jr.
By Attorney, George H. Christy

UNITED STATES PATENT OFFICE.

WILLIAM LEIGHTON, JR., OF WHEELING, WEST VIRGINIA.

MANUFACTURE OF SPANGLED GLASSWARE.

SPECIFICATION forming part of Letters Patent No. 292,663, dated January 29, 1884.

Application filed September 26, 1883. (Specimens.)

*To all whom it may concern:*

Be it known that I, WILLIAM LEIGHTON, Jr., a citizen of the United States, residing at Wheeling, county of Ohio, State of West Virginia, have invented or discovered a new and useful Improvement in Manufacture of Spangled Glassware; and I do hereby declare the following to be a full, clear, concise, and exact description thereof, reference being had to the accompanying drawings, making a part of this specification, in which—like letters indicating like parts—

Figure 1:
Figure 2:
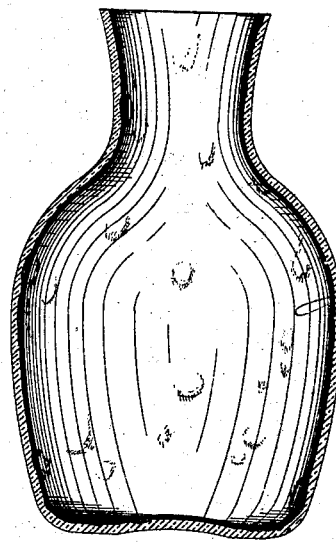

Figure 1 is a view in perspective of a glass pitcher made under my invention, and Fig. 2 a vertical section through the same.

The object of my invention is the production of articles of glassware for table, bar, or lamp use, ornamented by spangles or flakes of high crystalline brilliancy, and of any desired shade of color; and to this end my improvements consist in a novel method of embedding flakes or fragments of infusible crystalline material within the substance of the glass, and in an article of glassware spangled or flaked with crystalline material covered by a superimposed layer or layers of glass, as hereinafter more fully set forth.

To carry out my invention, I incorporate into the substance of the glass, while the same is in a plastic condition, a series of spangles, flakes, or fragments of infusible crystalline material, and thereafter blow the glass in the usual manner. I have in practice effectively and conveniently conducted the operation by gathering from the melting-pot a ball of glass, and rolling it, while still hot, upon a marver, over the surface of which are spread, in such relative arrangement as may be desired, flakes of colorless infusible crystalline material—such as mica—which I have found most desirable for the purpose. These flakes, which, to produce the best effect in the finished article, should be very thin and of irregular size, shape, and disposition, (although they may be uniform in these particulars, if preferred,) will, in the rolling, adhere to the hot glass. The ball with the adhering flakes is then returned to the pot, and an additional layer of glass, of any desired color, is gathered upon it. The ball of glass thus formed is then blown, in the usual manner, into any desired shape, and the flakes, being destitute of color, and acquiring, by the action of the heat, considerable opacity, assume, by their reflective power, the tint or tints of the superimposed glass. The ball, after being flecked with the crystalline material, may be coated more than once with glass, if desired, or may receive platings of different colors. The resultant article of glassware presents the ornamental effect of spangles or flakes of a high degree of crystalline brilliancy, and may be of colors as vivid as desired, the spangles or flakes corresponding in tint with the superimposed or outer layers of glass.

The specific method of incorporating the spangles or flakes into the substance of the glass, as above set forth, is a simple and desirable one; but I do not desire to limit myself thereto, as the same result may be otherwise attained without departing from the spirit of my invention.

I claim herein as my invention—

1. The improvement in the art of manufacturing ornamented glassware, which consists in incorporating spangles, flakes, or fragments of infusible crystalline material into the substance and between the layers of glass after fusion and while in a plastic condition, and thereafter blowing the same into any desired shape, substantially as set forth.

2. The improvement in the art of manufacturing ornamented glassware, which consists in gathering a ball from a melting-pot, rolling said ball on a marver, on which is spread infusible crystalline material in flakes or fragments, gathering an additional layer of glass upon said ball by returning it to the melting-pot, and finally blowing the ball into any desired shape, substantially as set forth.

3. As a new article of manufacture, a piece of glassware having spangles or flakes of infusible crystalline material embedded between upper and lower layers or strata of its mass, substantially as set forth.

In testimony whereof I have hereunto set my hand.

WILLIAM LEIGHTON, JR.

Witnesses:
 HARRISON BELLVILLE,
 A. G. FROHME.